US008494338B2

(12) United States Patent
Murabayashi

(10) Patent No.: US 8,494,338 B2
(45) Date of Patent: Jul. 23, 2013

(54) ELECTRONIC APPARATUS, VIDEO CONTENT EDITING METHOD, AND PROGRAM

(75) Inventor: Noboru Murabayashi, Saitama (JP)

(73) Assignee: Sony Corporation (JP)

( * ) Notice: Subject to any disclaimer, the term of this patent is extended or adjusted under 35 U.S.C. 154(b) by 830 days.

(21) Appl. No.: 12/456,825

(22) Filed: Jun. 23, 2009

(65) Prior Publication Data

US 2010/0008641 A1    Jan. 14, 2010

(30) Foreign Application Priority Data

Jun. 24, 2008  (JP) ................................ P2008-164652

(51) Int. Cl.
  *H04N 5/765*    (2006.01)
  *H04N 5/931*    (2006.01)
(52) U.S. Cl.
  USPC ......................................... 386/200; 386/204
(58) Field of Classification Search
  None
  See application file for complete search history.

(56) References Cited

U.S. PATENT DOCUMENTS 7,521,622 B1 *  4/2009  Zhang ............................. 84/609
7,649,988 B2 *  1/2010  Suppappola et al. ..... 379/406.03
7,684,982 B2 *  3/2010  Taneda .......................... 704/233

FOREIGN PATENT DOCUMENTS

JP       2001-202082 A     7/2001

* cited by examiner

*Primary Examiner* — William C Vaughn, Jr.
*Assistant Examiner* — Oluwaseun A Adegeye
(74) *Attorney, Agent, or Firm* — Lerner, David, Littenberg, Krumholz & Mentlik, LLP

(57) ABSTRACT

An electronic apparatus includes a first input unit to input an image signal and a first audio signal that constitute a first video content, a second input unit to input a second audio signal different from the first audio signal, a first calculation unit to detect a face image area in which a face of a person is included from the image signal input, and calculate a face evaluation value evaluating a certainty of the face image area detected, a second calculation unit to detect a voice of the person from the first audio signal input, and calculate a voice evaluation value evaluating a volume of the voice, a setting unit to set first and second weighting factors for each image signal, and a generation unit to generate a third audio signal, and generate a second video content constituted of the third audio signal and the image signal.

11 Claims, 8 Drawing Sheets

| | | Face evaluation value | |
|---|---|---|---|
| | | Threshold value Tfs or more | Less than threshold value Tfs |
| Voice evaluation value | Threshold value Tvs or more | $k = k1$ $(k1 < 0.5)$<br>$m = 1 - k1$ | Set weighting factors according to face evaluation value and voice evaluation value |
| | Less than threshold value Tvs | Set weighting factors according to face evaluation value and voice evaluation value | $k = k2$ $(k2 > 0.5)$<br>$m = 1 - k2$ |

Sound after editing = (BGM sound)k + (Content sound)m k: BGM sound weighting factor
m: Content sound weighting factor

FIG.6

ELECTRONIC APPARATUS, VIDEO CONTENT EDITING METHOD, AND PROGRAM

CROSS-REFERENCE TO RELATED APPLICATION

The present application claims priority from Japanese Patent Application No. JP 2008-164652 filed in the Japanese Patent Office on Jun. 24, 2008, the entire content of which is incorporated herein by reference.

BACKGROUND OF THE INVENTION

1. Field of the Invention

The present invention relates to an electronic apparatus capable of editing a video content, a video content editing method in the electronic apparatus, and a program therefor.

2. Description of the Related Art

In the past, an editing operation of adding BGM (Background Music), a sound effect, or the like to a video content shot with a camcorder or the like has been performed. For example, Japanese Patent Application Laid-open No. 2001-202082 (paragraphs 0024 and 0031, FIG. 2, etc.) (hereinafter, referred to as Patent Document 1) discloses a video signal editing apparatus in which features (recording time period and the number of images) of a video as an editing target are extracted, and optimum music for the editing target video is automatically generated based on an instruction given by a predetermined user and is added to the editing target video.

SUMMARY OF THE INVENTION

In the technique disclosed in Patent Document 1, however, when music is added to the editing target video, an original audio signal recorded on the original editing target video is erased. Therefore, depending on scenes, leaving the original signal rather than adding music can make the editing target video more impressive in some cases. But, this is difficult to be realized by the technique disclosed in Patent Document 1, which hampers convenience of a user. In addition, generally, the user may manually select a section in the editing target video to which music is to be added and a section in which an original audio signal is to be left to edit them. But, those tasks are extremely complicated and troublesome.

In view of the above-mentioned circumstances, it is desirable to provide an electronic apparatus, a video content editing method, and a program capable of effectively leaving an audio signal in an original video content and adding another audio signal depending on scenes.

According to an embodiment of the present invention, there is provided an electronic apparatus. The electronic apparatus includes a first input means, a second input means, a first calculation means, a second calculation means, a setting means, and a generation means. The first input means inputs an image signal and a first audio signal that constitute a first video content. The second input means inputs a second audio signal different from the first audio signal. The first calculation means detects a face image area in which a face of a person is included from the image signal input, and calculates a face evaluation value evaluating a certainty of the face image area detected. The second calculation means detects a voice of the person from the first audio signal input, and calculates a voice evaluation value evaluating a volume of the voice detected. The setting means sets a first weighting factor and a second weighting factor for each image signal based on the face evaluation value and the voice evaluation value that are calculated, the first weighting factor indicating a weight of the first audio signal, the second weighting factor indicating a weight of the second audio signal. The generation means generates a third audio signal in which the first audio signal and the second audio signal are mixed, based on the first weighting factor and the second weighting factor that are set, and generates a second video content constituted of the third audio signal and the image signal.

Herein, Examples of the electronic apparatus include a PC (Personal Computer), a recording/reproducing apparatus using a recording medium such as an HDD (Hard Disk Drive)/DVD/BD (Blu-ray Disc), a digital video camera, mobile AV equipment, a mobile phone, and a game machine. The first video content refers to a video content recorded by an apparatus such as a camcorder, a video content received via a network, or the like. The second audio signal refers to an audio signal for BGM, a sound effect, or the like.

With this structure, the electronic apparatus can change the weights of the first and second audio signals based on the face image and the voice contained in the first video content, and generate the second video content from the first video content. Thus, the voice of the person is left as it is or another sound is inserted depending on scenes, with the result that an editing effect can be increased and more impressive second video content can be generated, as compared to a case where another sound is just inserted into the first video content.

The setting means may set, when the face evaluation value is equal to or larger than a first threshold value and the voice evaluation value is equal to or larger than a second threshold value, the first weighting factor to a first value larger than the second weighting factor.

In a case where both the face evaluation value and the voice evaluation value are large, it is highly possible that the person who shows up in the first video content speaks. In this case, the first weighting factor is set to be larger than the second weighting factor as much as possible to emphasize the voice of the person, with the result that the person can be further impressed. Here, the first value may be set to 1.

The setting means may set, when the face evaluation value is smaller than the first threshold value and the voice evaluation value is smaller than the second threshold value, the first weighting factor to a second value smaller than the second weighting factor.

In a case where both the face evaluation value and the voice evaluation value are small, it is highly possible that the person does not show up in the first video content. In this case, the first weighting factor is set to be smaller than the second weighting factor as much as possible to emphasize the second audio signal, and therefore, it is possible to perform editing such that unspectacular scenes in the first video content changes to be more attractive. Here, the second value may be set to 0.

The setting means may set, when the face evaluation value is equal to or larger than the first threshold value and the voice evaluation value is smaller than the second threshold value, the first weighting factor to be larger than the second weighting factor in accordance with the face evaluation value and the voice evaluation value.

In a case where the face evaluation value is large and the voice evaluation value is small, the face of the person shows up in the first video content, so the person probably says something in a small voice. In this case, the weight of the first audio signal is set to be large while adding the second audio signal, with the result that the effect of the second audio signal can be added while emphasizing the first audio signal.

The setting means may set, when the face evaluation value is smaller than the first threshold value and the voice evaluation value is equal to or larger than the second threshold value, the first weighting factor to be smaller than the second weighting factor in accordance with the face evaluation value and the voice evaluation value.

In a case where the face evaluation value is small and the voice evaluation value is large, the person hardly shows up in the first video content, so even when some voice of a person is contained, the voice hardly relates to the image probably. In this case, the weight of the second audio signal is set to be large while leaving the first audio signal, with the result that the effect of the second audio signal can be increased while leaving the effect of the first audio signal.

The electronic apparatus according may further include a storage means for storing face feature data indicating a feature of a face of a specific person.

In this case, the first calculation means may be capable of detecting a face image area in which the face of the specific person is included based on the face feature data stored.

With this structure, even when a plurality of persons' faces show up in the video content, it is possible to distinguish the face of the specific person from faces of other persons and detect the face. Therefore, the setting processings of the weighting factors of the first and second audio signals can be effectively performed with the specific person being focused on.

The electronic may further includes a storage means for storing voice feature data indicating a feature of a voice of a specific person.

In this case, the second calculation means may be capable of detecting the voice of the specific person based on the voice feature data stored.

With this structure, even when a plurality of persons' voices are contained in the video content, it is possible to distinguish the voice of the specific person from voices of other persons. Therefore, the setting processings of the weighting factors of the first and second audio signals can be effectively performed with the specific person being focused on.

According to another embodiment of the present invention, there is provided a method of editing a video content. The method includes inputting an image signal and a first audio signal that constitute a first video content, and inputting a second audio signal different from the first audio signal.

The method also includes detecting a face image area in which a face of a person is included from the image signal input, and calculating a face evaluation value evaluating a certainty of the face image area detected.

The method also includes detecting a voice of the person from the first audio signal input, and calculating a voice evaluation value evaluating a volume of the voice detected.

The method also includes setting a first weighting factor and a second weighting factor for each image signal based on the face evaluation value and the voice evaluation value that are calculated, the first weighting factor indicating a weight of the first audio signal, the second weighting factor indicating a weight of the second audio signal.

The method also includes generating a third audio signal in which the first audio signal and the second audio signal are mixed, based on the first weighting factor and the second weighting factor that are set, and generating a second video content constituted of the third audio signal and the image signal.

With this structure, the voice of the person is left as it is or another sound is inserted depending on scenes, with the result that an editing effect can be increased and more impressive second video content can be generated, as compared to a case where another sound is just inserted into the first video content.

According to another embodiment of the present invention, there is provided a program to cause an electronic apparatus to execute a first input step, a second input step, a first calculation step, a second calculation step, a setting step, and a generation step.

In the first input step, an image signal and a first audio signal that constitute a first video content is input.

In the second input step, a second audio signal different from the first audio signal is input.

In the first calculation step, a face image area in which a face of a person is included is detected from the image signal input, and a face evaluation value evaluating a certainty of the face image area detected is calculated.

In the second calculation step, a voice of the person is detected from the first audio signal input, and a voice evaluation value evaluating a volume of the voice detected is calculated.

In the setting step, a first weighting factor and a second weighting factor is set for each image signal based on the face evaluation value and the voice evaluation value that are calculated, the first weighting factor indicating a weight of the first audio signal, the second weighting factor indicating a weight of the second audio signal.

In the generation step, a third audio signal in which the first audio signal and the second audio signal are mixed is generated based on the first weighting factor and the second weighting factor that are set, and a second video content constituted of the third audio signal and the image signal is generated.

According to another embodiment of the present invention, there is provided an electronic apparatus. The electronic apparatus includes a first input unit, a second input unit, a first calculation unit, a second calculation unit, a setting unit, and a generation unit. The first input unit inputs an image signal and a first audio signal that constitute a first video content. The second input unit inputs a second audio signal different from the first audio signal. The first calculation unit detects a face image area in which a face of a person is included from the image signal input, and calculates a face evaluation value evaluating a certainty of the face image area detected. The second calculation unit detects a voice of the person from the first audio signal input, and calculates a voice evaluation value evaluating a volume of the voice detected. The setting unit sets a first weighting factor and a second weighting factor for each image signal based on the face evaluation value and the voice evaluation value that are calculated, the first weighting factor indicating a weight of the first audio signal, the second weighting factor indicating a weight of the second audio signal. The generation unit generates a third audio signal in which the first audio signal and the second audio signal are mixed, based on the first weighting factor and the second weighting factor that are set, and generates a second video content constituted of the third audio signal and the image signal.

As described above, according to the present invention, while effectively leaving the audio signal in the original video content, another audio signal can be added depending on the scenes.

These and other objects, features and advantages of the present invention will become more apparent in light of the following detailed description of best mode embodiments thereof, as illustrated in the accompanying drawings.

BRIEF DESCRIPTION OF DRAWINGS

FIG. 6 is a table showing setting processings of weighting factors k and m in the embodiment of the present invention;

DESCRIPTION OF PREFERRED EMBODIMENTS

Hereinafter, an embodiment of the present invention will be described with reference to the drawings.

Figure 1:
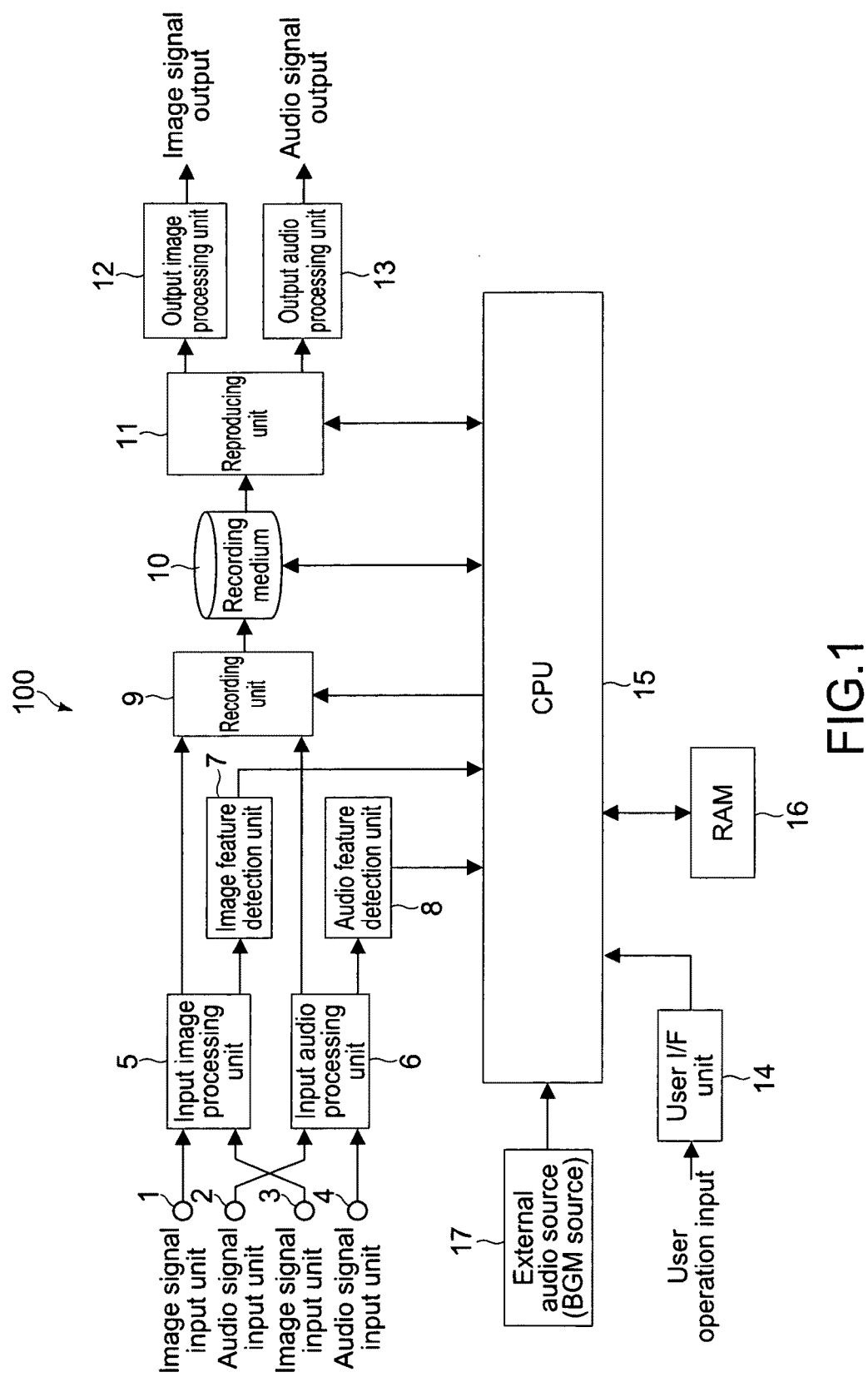
FIG. 1 is a block diagram showing a structure of a recording/reproducing apparatus according to an embodiment of the present invention.

FIG. 1 is a block diagram showing a structure of a recording/reproducing apparatus according to an embodiment of the present invention.

As shown in FIG. 1, a recording/reproducing apparatus 100 according to this embodiment includes image signal input units 1 and 3, audio signal input units 2 and 4, an input image processing unit 5, an input audio processing unit 6, an image feature detection unit 7, an audio feature detection unit 8, a recording unit 9, and a recording medium 10. The recording/reproducing apparatus 100 also includes a reproducing unit 11, an output image processing unit 12, an output audio processing unit 13, a user interface unit 14, a CPU (Central Processing Unit) 15, and a RAM (Random Access Memory) 16.

The image signal input units 1 and 3 are various wire communication terminals or wireless communication units. Examples of the wire communication terminals include an S terminal, an RCA terminal, a DVI (Digital Visual Interface) terminal, an HDMI (High-Definition Multimedia Interface) terminal, and an Ethernet (registered trademark) terminal. A USB (Universal Serial Bus) terminal, an IEEE 1394 terminal, or the like may also be used therefor. Examples of the wireless communication units include a wireless LAN, a Bluetooth (registered trademark), a wireless USB, and a wireless HDMI. The wire communication terminal and the wireless communication terminal are not limited to those. From each of the image signal input units 1 and 3, an image signal of a video content is input to the recording/reproducing apparatus 100 and supplied to the input image processing unit 5 through various cables or wireless networks. Here, the video content refers to a content shot with a camcorder or the like or a content on the Internet, for example.

The audio signal input units 2 and 4 are also various wire communication terminals or wireless communication units, and examples thereof are nearly the same as the terminals and the units described above except for the S terminal and the DVI terminal. From each of the audio signal input units 2 and 4, an audio signal of an image content is input to the recording/reproducing apparatus 100 and supplied to the input audio processing unit 6 through the various cables or wireless networks.

In addition, the image signal input units 1 and 3 and the audio signal input units 2 and 4 each may be, for example, a tuner and an antenna input terminal for inputting an image signal and an audio signal included in a digital broadcast signal into the recording/reproducing apparatus 100 via an antenna (not shown).

The input image processing unit 5 performs various signal processings such as a digital conversion processing and an encoding processing on the input image signal, and then outputs the signal to the image feature detection unit 7 and the recording unit 9 as a digital image signal.

The input audio processing unit 6 performs various signal processings such as a digital conversion processing and an encoding processing on the input audio signal, and then outputs the signal to the audio feature detection unit 8 and the recording unit 9 as a digital audio signal.

The image feature detection unit 7 detects a face image (face image area) that indicates a person's face from image signals supplied from the input image processing unit 5, and calculates a face evaluation value for evaluating a certainty of the face image area.

The audio feature detection unit 8 detects a person's voice from audio signals supplied from the input audio processing unit 6, and calculates a voice evaluation value for evaluating a volume of the detected voice.

The recording unit 9 multiplexes the image signals supplied from the input image processing unit 5 and the audio signals supplied from the input audio processing unit 6, and records the multiplexed signals on the recording medium 10.

As the recording medium 10, a built-in recording medium such as an HDD and a flash memory and a portable recording medium such as an optical disc and a memory card may be used. As the optical disc, a BD, a DVD, a CD, and the like may be used. The recording medium 10 stores various video contents, various programs, data, and the like. In a case where the recording medium 10 is the built-in recording medium, the recording medium 10 stores an OS, and various programs and data for performing a detection processing of the face image, a detection processing of the voice, a learning processing of these detection processings, an audio editing processing of the video content, and the like. In a case where the recording medium 10 is the portable recording medium, the recording/reproducing apparatus 100 is additionally provided with a built-in recording medium (not shown) for recording the various programs and data mentioned above.

The reproducing unit 11 reads the multiplexed image signals and audio signals recorded on the recording medium 10 to separate them, decodes the separated image signals and audio signals, and supplies the image signals to the output image processing unit 12 and supplies the audio signals to the output audio processing unit 13. As a compression format of the image signal and the audio signal, MPEG (Moving Picture Expert Group)-2 or MPEG-4 may be used, for example.

The output image processing unit 12 performs various signal processings such as an analog conversion processing and an OSD (On Screen Display) processing, and outputs the image signal to an external apparatus such as a liquid crystal display connected to the recording/reproducing apparatus 100 or to a liquid crystal display incorporated in the recording/reproducing apparatus 100.

The output audio processing unit 13 performs various signal processings such as the analog conversion processing, and outputs the audio signal to the external apparatus or the built-in liquid crystal display.

Examples of the user interface unit 14 include an operation button, a switch, a mouse, a keyboard, and an infrared-ray-signal reception unit of a remote controller. Various instructions by a user's operation are input to the user interface unit 14 and output to the CPU 15 therefrom.

The CPU 15 accesses the RAM 16 and the like as appropriate, and performs overall control on blocks of the recording/reproducing apparatus 100. The RAM 16 is used as a work area and the like of the CPU 15, and temporarily stores an OS (Operating System), a program, processing data, and the like.

An external audio source 17 is an external apparatus such as a PC and various AV equipments, and stores an audio signal (hereinafter, referred to as BGM sound) of BGM (or sound effect) to be inserted in the video content, and inputs the audio signal to the CPU 15 through various interfaces. Alternatively, the external audio source 17 may be a recording medium incorporated in or mounted on the recording/reproducing apparatus 100, e.g., the recording medium 10.

Next, an operation of the recording/reproducing apparatus 100 structured as described above will be described.

In this embodiment, the recording/reproducing apparatus 100 can edit the video content to insert in the video content the BGM sound stored in the external audio source 17. When the BGM sound is inserted, the recording/reproducing apparatus 100 detects a face image from the image signal of the video content and detects a voice from the audio signal, as described above. Based on this, the recording/reproducing apparatus 100 judges whether the insertion of the BGM sound is appropriate or not. In particular, for the detection of the face image, the recording/reproducing apparatus 100 performs a learning processing as a preprocessing. The learning processing will be described in the following.

Figure 2:
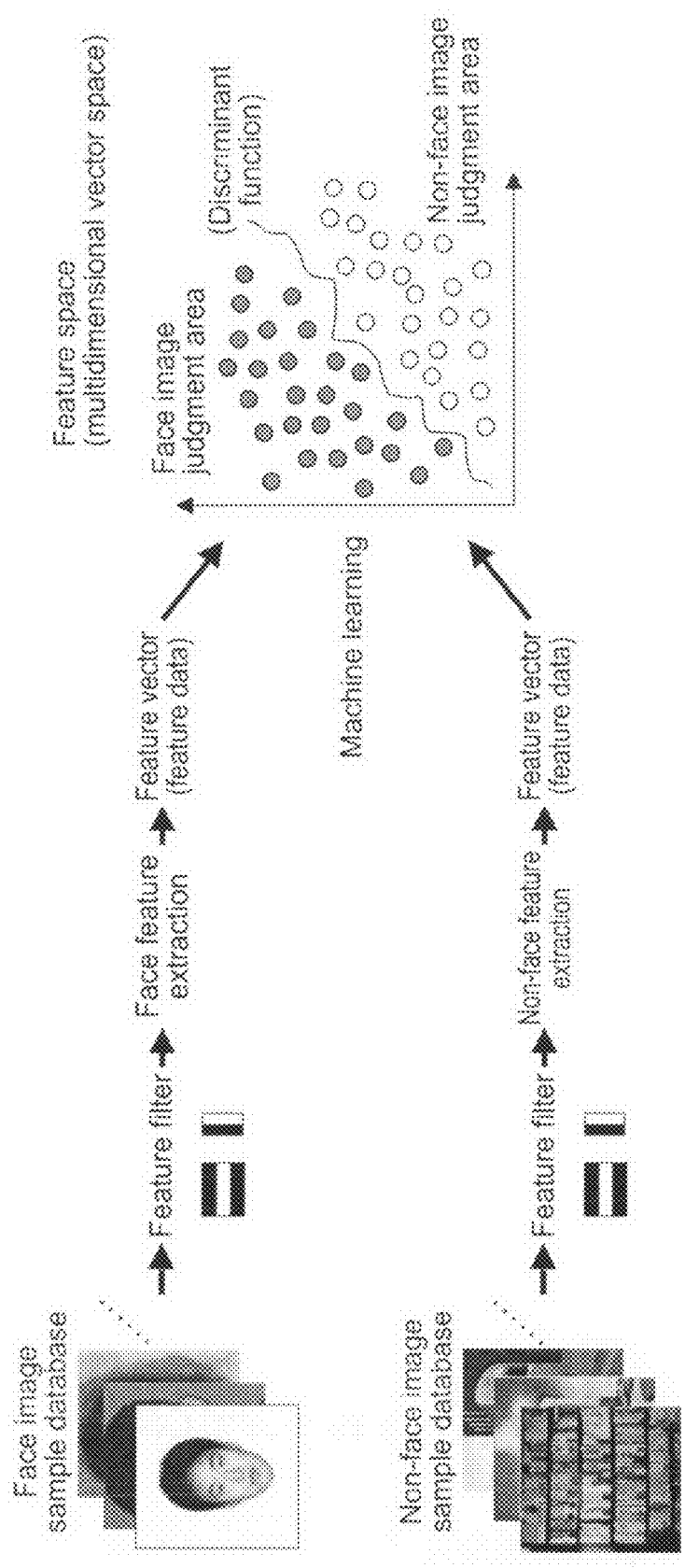
FIG. 2 is a diagram conceptually illustrating a learning processing for a detection of a face image in the embodiment of the present invention.

FIG. 2 is a diagram conceptually illustrating the learning processing for the detection of the face image.

As shown in FIG. 2, in the recording medium 10 of the recording/reproducing apparatus 100, face image sample data that indicates samples of face images of various persons and non-face image sample data that indicates samples of non-face images are compiled as a database and stored as data for learning.

The image feature detection unit 7 of the recording/reproducing apparatus 100 filters the sample image data stored in the face image sample database and the non-face image sample database by a feature filter, extracts individual face features, and detects a feature vector (feature data).

As shown in FIG. 2, the feature filter detects some parts and masks other parts of rectangles in an image. With the use of the feature filter, a positional relationship among eyes, eyebrows, a nose, cheeks, and other parts is detected from the face image sample data as a face feature, and a configuration of an object other than the face, a positional relationship among constituents of the object, and the like are detected from the non-face image sample data as a non-face feature. The feature filter is not limited to the rectangular feature filter, and a separation degree filter for detecting a feature of a circular form, a Gabor filter for detecting positional relationships among the parts of the face based on edges in specific directions, or the like may be used. For the detection of the face feature, in addition to the feature filter, brightness distribution information and skin color information may be used, for example.

Here, it is difficult for the image feature detection unit 7 to recognize the size and position of the face area based on the sample image data. Accordingly, in a case where a size of a frame of the feature filter is changed and the feature filtering is performed, the image feature detection unit 7 recognizes, as the size of the face area, a size of the feature filter when the most probable detection value is obtained, and extracts the face feature. In addition, in a case where an entire area of the sample image data is scanned by the feature filter, the image feature detection unit 7 recognizes, as the position of the face area, a position of the feature filter when the most probable detection value is obtained, and extracts the face feature.

The image feature detection unit 7 generates a multidimensional feature vector based on the features extracted from the face image sample data and the non-face image sample data. Then, the image feature detection unit 7 represents the feature vector by a multidimensional vector space, and generates a discriminant function by statistical machine learning. The generated discriminant function is stored in the recording medium 10 or the like and used when the face image is detected from the video content as the editing target.

Further, instead of a discriminant analysis processing using the discriminant function, discriminant analysis processings using machine learning methods such as a support vector machine (SVM), Ada-boost, and a neural network may be performed. In this case, instead of the discriminant function, a processing module for performing the discriminant processing is incorporated in the recording/reproducing apparatus 100. The same holds true for a processing involving the discriminant function in the following description.

Next, a description will be given on a processing of editing the video content and inserting BGM data in the video content by the recording/reproducing apparatus 100 in this embodiment.

Figure 3:
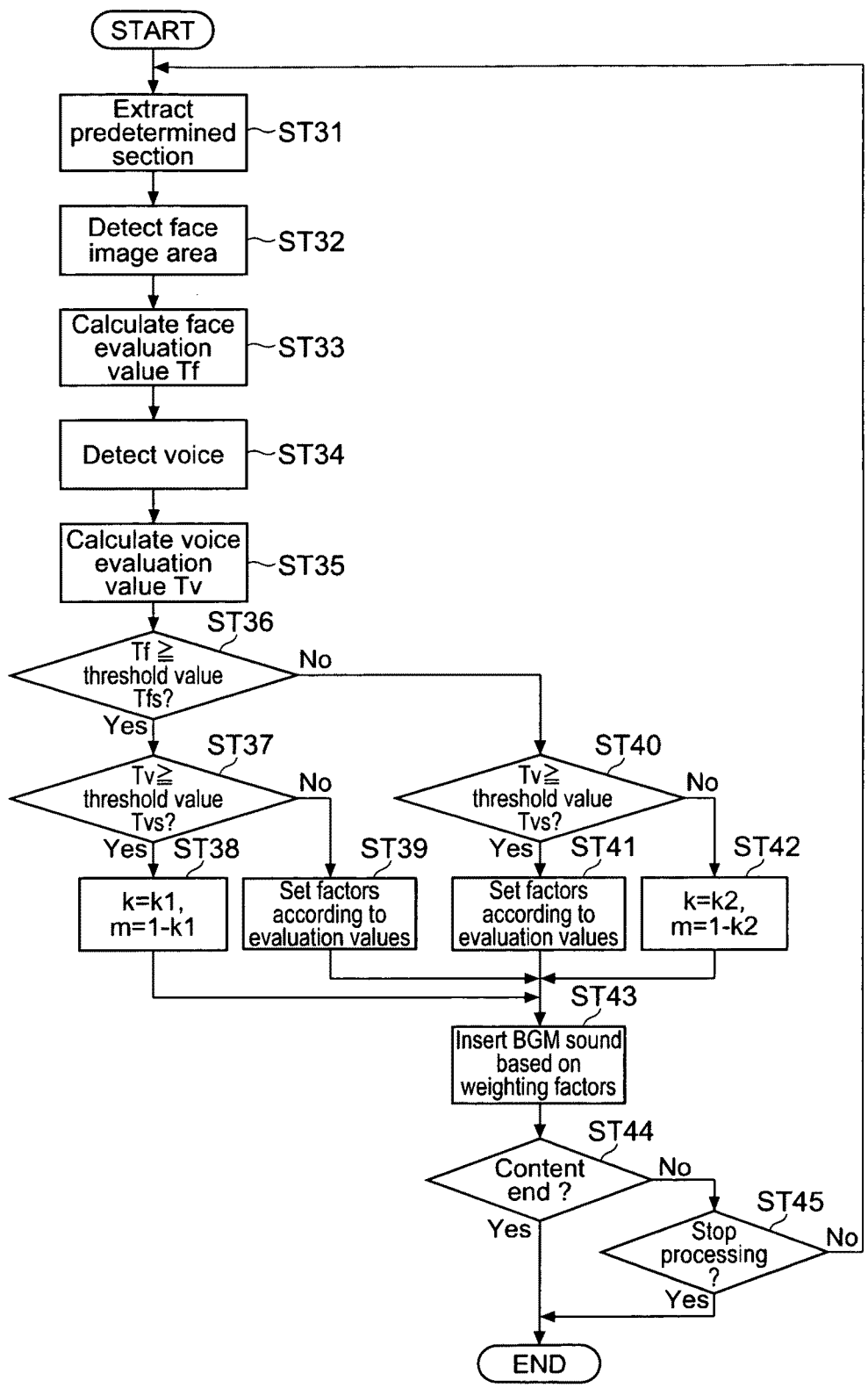
FIG. 3 is a flowchart showing a flow of a BGM insertion processing to a video content by the recording/reproducing apparatus according to the embodiment of the present invention.

FIG. 3 is a flowchart showing a flow of a BGM insertion processing to the video content by the recording/reproducing apparatus 100.

As shown in FIG. 3, first, the editing target video content is read from the recording medium 10, or input from the image signal input unit 1 or 3 and the audio signal input unit 2 or 4. Subsequently, the CPU 15 extracts from the video content an image signal and an audio signal of predetermined sections (predetermined number of continuous frames) (Step 31). The extracted image signal of the predetermined section is supplied to the image feature detection unit 7, and the extracted audio signal of the predetermined section is supplied to the audio feature detection unit 8.

Figure 4:
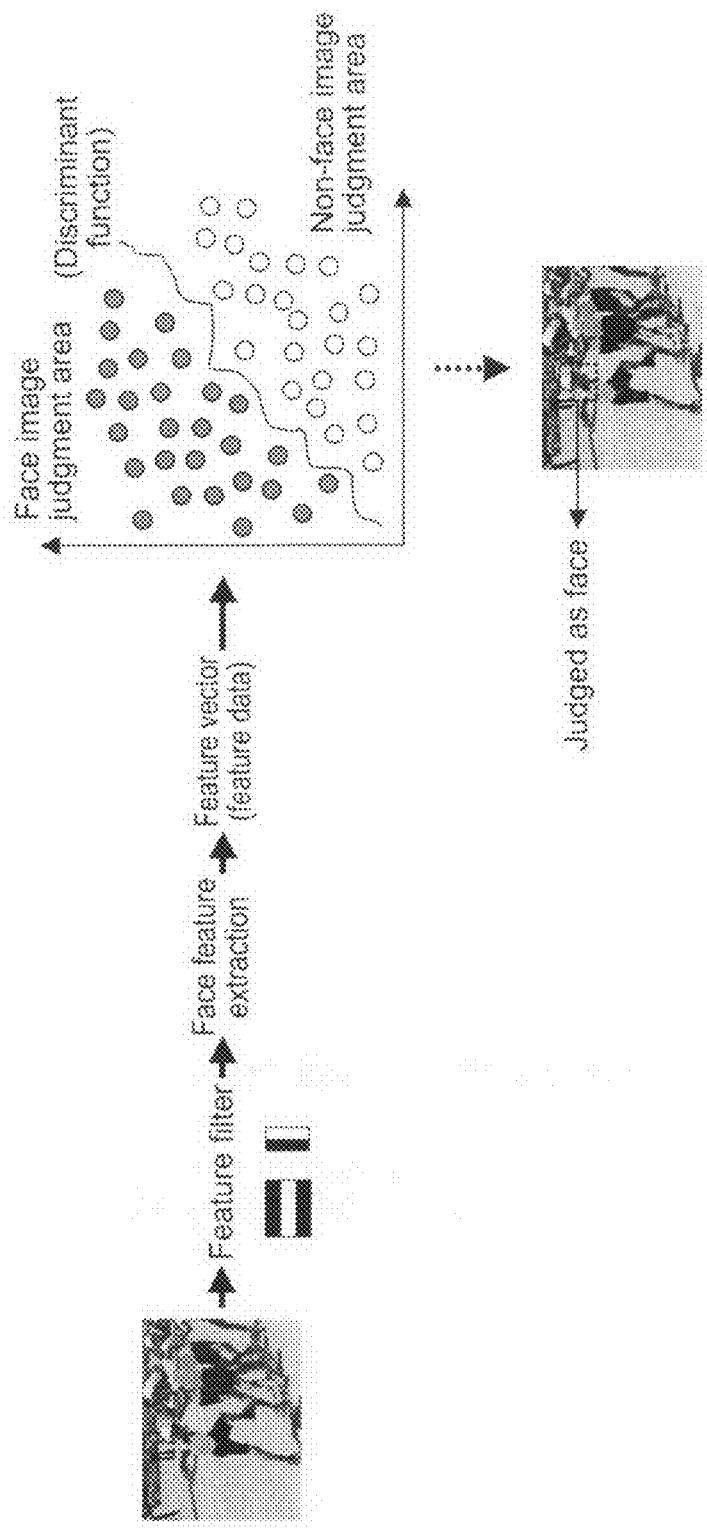
FIG. 4 is a diagram conceptually showing a detection processing of a face image area in the embodiment of the present invention.

Subsequently, the image feature detection unit 7 detects a face image area from the image signal of the predetermined section by using the discriminant function (Step 32). FIG. 4 is a diagram conceptually showing the detection processing of the face image area. As shown in FIG. 4, the image feature detection unit 7 filters the image signal of the predetermined section with the feature filter, detects the face feature, and generates the multidimensional feature vector. Then, the image feature detection unit 7 puts a value of each dimension of the feature vectors into a variable of each dimension of the discriminant function, and judges whether the image signal includes the face image area based on whether an output of the discriminant function is positive or negative.

Then, the image feature detection unit 7 calculates a face evaluation value Tf for evaluating the certainty of the face image detection based on the output value of the discriminant function (Step 32). The face evaluation value refers to an output value of the discriminant function that is expressed in percentage when the feature vector is generated based on predetermined, definite face image data and the generated feature vector is input to the discriminant function.

Figure 5:
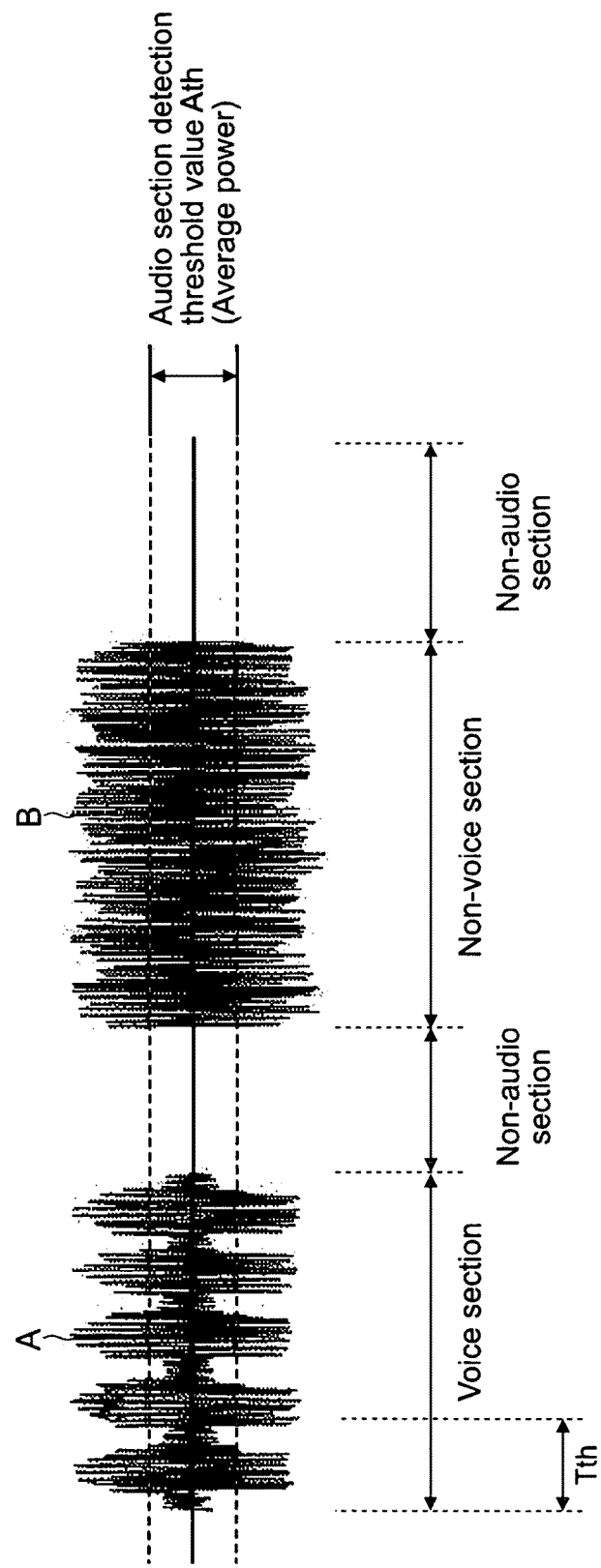
FIG. 5 is a diagram conceptually showing a voice detection processing in the embodiment of the present invention.

Subsequently, the audio feature detection unit 8 detects a section including a person's voice from the audio signal of the predetermined section (Step 34). FIG. 5 is a diagram conceptually showing a voice detection processing. In FIG. 5, power of the audio signal of the predetermined section is indicated. A waveform A shown in FIG. 5 indicates a person's voice, and a waveform B shown in FIG. 5 indicates a sound other than the person's voice.

As shown in FIG. 5, first, the audio feature detection unit 8 sets a threshold value Ath relating to the audio power in order to remove a noise influence. Then, when average power in the predetermined section is larger than Ath, the audio feature detection unit 8 judges that the section is an audio section. When the average power is smaller than Ath, the audio feature detection unit 8 judges that the section is a non-audio section. That is, in FIG. 5, the audio signal other than the waveforms A and B is determined to be a signal of the non-audio section.

In the audio section, the person's voice includes a consonant, a vowel, an intake of breath, and the like, and therefore has a feature in that a continuous section of predetermined power or more is shorter than that of the sound other than the voice in music and the like. By using this feature, the audio feature detection unit 8 sets a threshold value Tth relating to a time period. In a case where an average continuous time period in which the predetermined power or more is obtained is smaller than Tth, the audio feature detection unit 8 judges that the section is a voice section, and in a case where the average continuous time period in which the predetermined power or more is obtained is larger than Tth, the audio feature detection unit 8 judges that the section is a non-voice section.

Subsequently, the audio feature detection unit 8 calculates a voice evaluation value Tv based on a volume (power level or amplitude) of the detected voice (Step 35). The voice evaluation value refers to a value indicating the power level of the voice that is expressed in percentage with a maximum power level of the voice that can be detected being 1.

Subsequently, the CPU 15 judges whether the face evaluation value Tf is equal to or larger than a predetermined threshold value Tfs (Step 36). When the face evaluation value Tf is equal to or larger than the threshold value Tfs (Yes), the CPU 15 judges whether the voice evaluation value Tv is equal to or larger than a predetermined threshold value Tvs (Step 37).

When the voice evaluation value Tv is equal to or larger than Tvs (Yes), the CPU 15 sets a weighting factor k of the BGM sound to a predetermined weight k1 that is smaller than 0.5, and sets a weighting factor m of the audio signal of the video content to 1-k1. For example, k1 is set to 0. Even when being not 0, k1 is set to a value as close to 0 as possible.

In Step 37, when the voice evaluation value Tv is smaller than the threshold value Tvs (No), the CPU 15 sets the weighting factors k and m based on the face evaluation value Tf and the voice evaluation value Tv (Step 39). That is, although both the weighting factors k and m are not 0 or 1, the weighting factor k is set to be smaller than the weighting factor m.

In Step 36, when the face evaluation value Tf is smaller than the threshold value Tfs (No), the CPU 15 judges whether the voice evaluation value Tv is equal to or larger than the predetermined threshold value Tvs (Step 40). When the voice evaluation value Tv is equal to or larger than the threshold value Tvs (Yes), the CPU 15 sets the weighting factors k and m based on the face evaluation value Tf and the voice evaluation value Tv (Step 41). That is, although both the weighting factors k and m are not 0 or 1, the weighting factor k is set to be larger than the weighting factor m.

In Step 40, when the voice evaluation value Tv is smaller than the threshold value Tvs (No), the CPU 15 sets the weighting factor k to a predetermined weight k2 that is larger than 0.5 and sets the weighting factor m to 1-k2. For example, k2 is set to 1. Even when being not 1, k2 is set to a value as close to 1 as possible.

The CPU 15 edits the video content for each predetermined section (for each frame) of the video content based on the weighting factors k and m set as described above, and inserts the BGM sound input from the external audio source 17 (Step 43).

The CPU 15 performs the above processings on the whole predetermined sections of the video content, or performs the above processings until the user or the like gives an instruction of stopping the processings (Steps 44 and 45). The CPU 15 multiplexes the video content that has been edited with the original image signal eventually, and stores the multiplexed content in the recording medium 10 as a new video content.

FIG. 6 is a table showing setting processings of the weighting factors k and m described above. As shown in FIG. 6, weighting factors of four patterns are set depending on whether the face evaluation value is equal to or larger than the threshold value Tfs and whether the voice evaluation value is equal to or larger than the threshold value Tvs.

Figure 7:
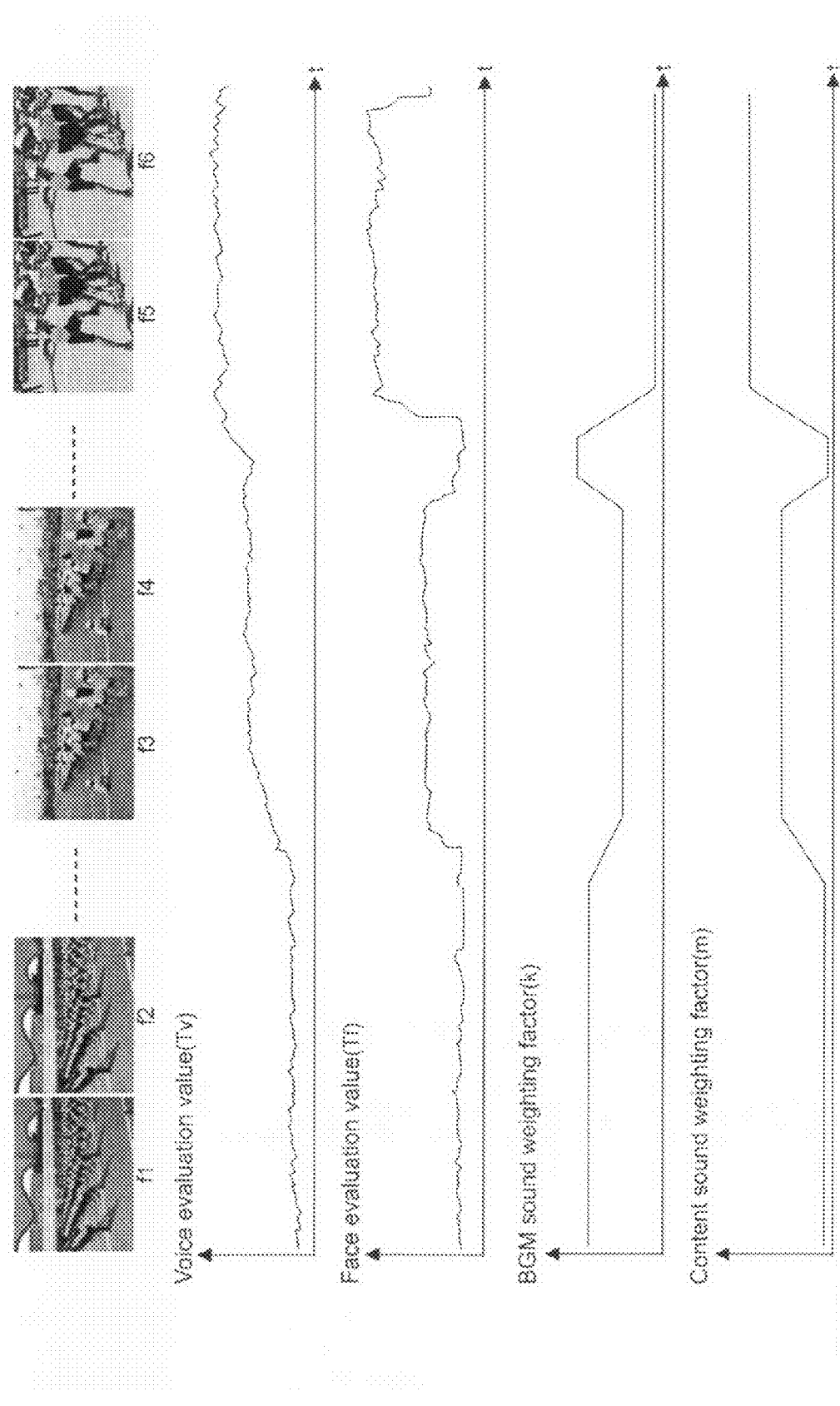
FIG. 7 is a graph showing relationships between frame images and each of a face evaluation value, a voice evaluation value, the weighting factors k and m, and the video content in the embodiment of the present invention.

FIG. 7 is a graph showing relationships between the frame images and each of the face evaluation value, the voice evaluation value, the weighting factors k and m, and the video content. Frames f1 to f6 shown in FIG. 7 indicate parts of frames of the video content including scenes of a school athletic meet shot with a camcorder or the like, as an example.

As shown in FIG. 7, in the frames f1 and f2 of the video content, faces are so small that face image areas are not detected by the image feature detection unit 7. Accordingly, the face evaluation value is small (smaller than the threshold value Tfs). Further, in the sections of the frames f1 and f2, the scenes are shot from a distance, so persons' voices are hardly collected. Accordingly, the voice evaluation value is small (smaller than the threshold value Tvs). Therefore, in those sections, the weighting factor k of the BGM sound is set to be high, and the weighting factor m of the audio signal of the content is set to be low. As a result, the edit processing is performed so that unspectacular scenes can be more attractive.

In the frames f3 and f4, persons are shot in closeup slightly, and collected voices are somewhat louder. Accordingly, in those sections, the weighing factors k and m are respectively set according to the face evaluation value and the voice evaluation value. Therefore, the persons' voices are left, and at the same time, an effect of the BGM insertion can be obtained. In other words, when the face evaluation value is equal to or larger than the threshold value Tfs and the voice evaluation value is smaller than the threshold value Tvs, the image feature detection unit 7 sets the weight of the BGM sound to be lower, with the result that a voice of a person who shows up in the image can be emphasized. Further, when the face evaluation value is smaller than the threshold value Tfs and the voice evaluation value is equal to or larger than the threshold value Tvs, the image feature detection unit 7 sets the weight of the BGM sound to be higher, with the result that the effect of the BGM can be increased instead of the persons' voices unrelated to the image.

In the frames f5 and f6, the persons are shot in closeup to such an extent that their faces can be clearly detected. Accordingly, the face evaluation value is large (equal to or larger than the threshold value Tfs). Further, the power level of the detected voices is large, and therefore the voice evaluation value is also large (equal to or larger than the threshold value Tvs). Thus, in those sections, the weighting factor k is set to be low, and the weighing factor m is set to be high. Accordingly, the person's voice is emphasized, with the result that the person can be further impressed.

As described above, according to this embodiment, the BGM sound is inserted in the video content based on the face evaluation value and the voice evaluation value. Therefore, the BGM sound can be inserted while effectively leaving the audio signal in the original video content depending on the scenes. As a result, as compared to a case where the BGM sound is just monotonously inserted, a more impressive, memorable video content can be obtained.

The present invention is not limited to the above embodiment, and can of course be variously modified without departing from the gist of the present invention.

In the above embodiment, the image feature detection unit 7 may detect an animal's face image in addition to the person's face image. Further, the audio feature detection unit 8 may detect an animal's voice in addition to the person's voice.

In the above embodiment, the image feature detection unit 7 may not only just detect the face image but also recognize a specific person's face image. The face recognition processing is performed after the face detection processing by the discriminant function. For the face recognition processing, an edge strength image, a frequency intensity image, a high order autocorrelation, a color conversion image, or the like can be used.

Figure 8:
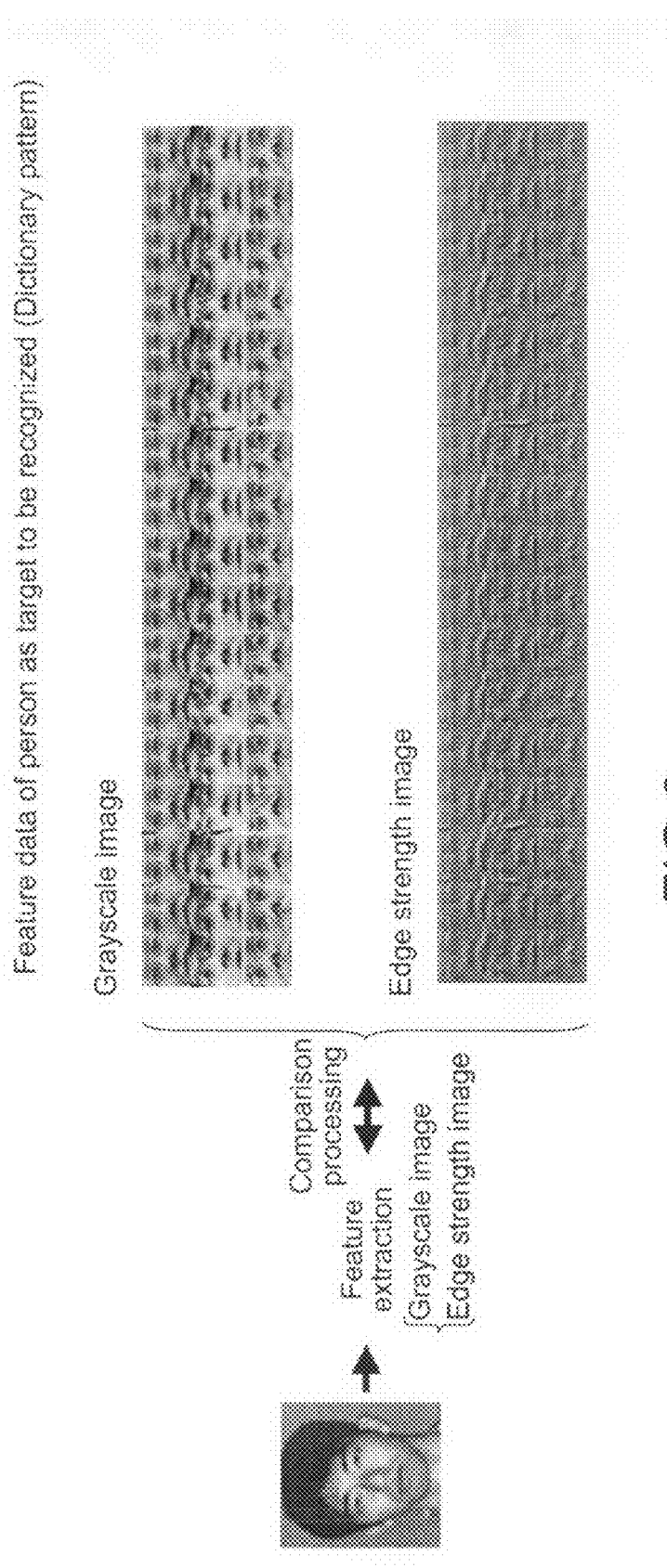
FIG. 8 is a diagram conceptually showing a face recognition processing using an edge strength image in another embodiment of the present invention.

FIG. 8 is a diagram conceptually showing a face recognition processing using the edge strength image.

As shown in FIG. 8, in the recording medium 10 or the like, grayscale images and edge strength images are stored as feature data (dictionary pattern) of a person whose face is to be recognized. The image feature detection unit 7 extracts a grayscale image and an edge strength image as the feature data from a detected face image. Then, the image feature detection unit 7 performs a comparison processing between the extracted grayscale image and edge strength image and the stored grayscale images and edge strength images of the person whose face is to be recognized by a pattern matching, with the result that the face image of the specific person can be recognized. In this case, the image feature detection unit 7 expresses a recognition rate (matching rate) of the face image in percentage, and may regard the recognition rate as the face evaluation value. In a case where information on face feature points such as eyes and nose is obtained, the image feature detection unit 7 can also use the information in addition to the edge strength image and the like.

By the above processing, it is possible to insert the BGM into the video content in accordance with the recognition rate of the specific person's face, for example, in accordance with the recognition rate of only a face of a user's child from among multiple children as in the example of FIG. 7. As a result, the video content that has been edited can be more impressive.

In the above embodiment, the audio feature detection unit 8 may not only just detect the voice but also recognize a specific person's voice. The voice recognition processing is performed as follows. For example, the audio feature detection unit 8 performs a frequency analysis on a signal of a voice of a person to be recognized, detects a spectral characteristic thereof, stores it in the recording medium 10 or the like, and performs a comparison processing (pattern matching) with the detected voice spectral characteristic. As the spectral characteristic, a spectral peak frequency of each of a consonant part and a vowel part, a spectral interval, and the like are used. Further, intervals or the like of the intake of breath differ among individuals. Therefore, the audio feature detection unit 8 may also use information on the intervals of the intake of breath in addition to the spectral characteristic. In this case, the audio feature detection unit 8 expresses a voice recognition rate (matching rate) in percentage, and regards the voice recognition rate as the voice evaluation value.

By the processing, it is possible to insert the BGM into the video content in accordance with the voice recognition rate of the specific person, with the result that the video content that has been edit can be more impressive.

In the above embodiment, in a case where the face evaluation value is smaller than the threshold value Tfs and the voice evaluation value is equal to or larger than the threshold value Tvs, the image feature detection unit 7 sets the weight of the BGM sound to be high. In this case, however, the image feature detection unit 7 may set the weight of the BGM sound to be low inversely. With this setting, both voices of the person as the shooting target and the person who shoots the target can be left. In addition, in a case where the voices can be recognized, even when the voice of the person who performs shooting is recognized but the face evaluation value is smaller than the threshold value Tfs, the weight of the BGM sound may be set to be low, if the voice evaluation value of the voice of the person who performs shooting is equal to or larger than the threshold value Tvs. With this setting, the voice of the person who performs shooting can be more reliably and effectively left.

In the above embodiment, the recording/reproducing apparatus 100 does not carry out the learning processing for the voice detection processing, but may of course carry out the learning processing.

In the above embodiment, the present invention is applied to the recording/reproducing apparatus as an example, but may of course be applied to other electronic apparatuses such as a PC, a digital video camera, mobile AV equipment, a mobile phone, and a game machine.

What is claimed is:

1. An electronic apparatus for editing video content, comprising:
   a first input means for inputting an image signal and a first audio signal that constitute a first video content;
   a second input means for inputting a second audio signal different from the first audio signal;
   a first calculation means for detecting a face image area in which a face of a person is included from the image signal input, and calculating a face evaluation value evaluating a certainty of the face image area detected;
   a second calculation means for detecting a voice of the person from the first audio signal input, and calculating a voice evaluation value evaluating a volume of the voice detected;
   a setting means for setting a first weighting factor and a second weighting factor for each image signal based on the face evaluation value and the voice evaluation value that are calculated, the first weighting factor indicating a weight of the first audio signal, the second weighting factor indicating a weight of the second audio signal; and
   a generation means for generating a third audio signal in which the first audio signal and the second audio signal are mixed, based on the first weighting factor and the second weighting factor that are set, and generating a second video content constituted of the third audio signal and the image signal,
   in which the second audio signal is background music, and
   in which the first weighting factor and the second weighting factor are set so as to cause the third audio signal to be generated such that the weight of the background music inserted therein is based upon the face evaluation value and the voice evaluation value so as to provide an effective use of the background music depending upon scenes of the input image signal.

2. The electronic apparatus according to claim 1, wherein the setting means sets, when the face evaluation value is equal to or larger than a first threshold value and the voice evaluation value is equal to or larger than a second threshold value, the first weighting factor to a first value larger than the second weighting factor.

3. The electronic apparatus according to claim 2, wherein the setting means sets, when the face evaluation value is smaller than the first threshold value and the voice evaluation value is smaller than the second threshold value, the first weighting factor to a second value smaller than the second weighting factor.

4. The electronic apparatus according to claim 3, wherein the setting means sets, when the face evaluation value is equal to or larger than the first threshold value and the voice evaluation value is smaller than the second threshold value, the first weighting factor to be larger than the second weighting factor in accordance with the face evaluation value and the voice evaluation value.

5. The electronic apparatus according to claim 3, wherein the setting means sets, when the face evaluation value is smaller than the first threshold value and the voice evaluation value is equal to or larger than the second threshold value, the first weighting factor to be smaller than the second weighting factor in accordance with the face evaluation value and the voice evaluation value.

6. The electronic apparatus according to claim 3, further comprising:
a storage means for storing face feature data indicating a feature of a face of a specific person,
wherein the first calculation means is capable of detecting a face image area in which the face of the specific person is included based on the face feature data stored.

7. The electronic apparatus according to claim 3, further comprising:
a storage means for storing voice feature data indicating a feature of a voice of a specific person,
wherein the second calculation means is capable of detecting the voice of the specific person based on the voice feature data stored.

8. A method of editing a video content, comprising:
inputting an image signal and a first audio signal that constitute a first video content;
inputting a second audio signal different from the first audio signal;
detecting a face image area in which a face of a person is included from the image signal input, and calculating a face evaluation value evaluating a certainty of the face image area detected;
detecting a voice of the person from the first audio signal input, and calculating a voice evaluation value evaluating a volume of the voice detected;
setting a first weighting factor and a second weighting factor for each image signal based on the face evaluation value and the voice evaluation value that are calculated, the first weighting factor indicating a weight of the first audio signal, the second weighting factor indicating a weight of the second audio signal; and
generating a third audio signal in which the first audio signal and the second audio signal are mixed, based on the first weighting factor and the second weighting factor that are set, and generating a second video content constituted of the third audio signal and the image signal,
in which the inputting of the image signal and the first audio signal, the inputting of the second audio signal, the detecting the face image area, the detecting the voice, the setting and the generating are performed by an electronic apparatus for editing the video content, and
in which the second audio signal is background music, and
in which the first weighting factor and the second weighting factor are set so as to cause the third audio signal to be generated such that the weight of the background music inserted therein is based upon the face evaluation value and the voice evaluation value so as to provide an effective use of the background music depending upon scenes of the input image signal.

9. A non-transitory computer readable memory having stored thereon a program to cause an electronic apparatus to execute the steps of:
inputting an image signal and a first audio signal that constitute a first video content;
inputting a second audio signal different from the first audio signal;
detecting a face image area in which a face of a person is included from the image signal input, and calculating a face evaluation value evaluating a certainty of the face image area detected;
detecting a voice of the person from the first audio signal input, and calculating a voice evaluation value evaluating a volume of the voice detected;
setting a first weighting factor and a second weighting factor for each image signal based on the face evaluation value and the voice evaluation value that are calculated, the first weighting factor indicating a weight of the first audio signal, the second weighting factor indicating a weight of the second audio signal; and
generating a third audio signal in which the first audio signal and the second audio signal are mixed, based on the first weighting factor and the second weighting factor that are set, and generating a second video content constituted of the third audio signal and the image signal,
in which the second audio signal is background music, and
in which the first weighting factor and the second weighting factor are set so as to cause the third audio signal to be generated such that the weight of the background music inserted therein is based upon the face evaluation value and the voice evaluation value so as to provide an effective use of the background music depending upon scenes of the input image signal.

10. An electronic apparatus for editing video content, comprising:
a first input unit to input an image signal and a first audio signal that constitute a first video content;
a second input unit to input a second audio signal different from the first audio signal;
a first calculation unit to detect a face image area in which a face of a person is included from the image signal input, and calculate a face evaluation value evaluating a certainty of the face image area detected;
a second calculation unit to detect a voice of the person from the first audio signal input, and calculate a voice evaluation value evaluating a volume of the voice detected;
a setting unit to set a first weighting factor and a second weighting factor for each image signal based on the face evaluation value and the voice evaluation value that are calculated, the first weighting factor indicating a weight of the first audio signal, the second weighting factor indicating a weight of the second audio signal; and a generation unit to generate a third audio signal in which the first audio signal and the second audio signal are mixed, based on the first weighting factor and the second weighting factor that are set, and generate a second video content constituted of the third audio signal and the image signal, in which the second audio signal is background music, and in which the first weighting factor and the second weighting factor are set so as to cause the third audio signal to be generated such that the weight of the background music inserted therein is based upon the face evaluation value and the voice evaluation value so as to provide an effective use of the background music depending upon scenes of the input image signal.

11. The electronic apparatus according to claim 1, wherein the first calculation means detects a respective face image area which includes a respective face of a specific person which is selected from among a plurality of people in the image signal and calculates the face evaluation value thereof.

* * * * *